United States Patent
Wu et al.

(10) Patent No.: US 9,178,384 B2
(45) Date of Patent: Nov. 3, 2015

(54) POWER SUPPLY SYSTEM OF ELECTRONIC DEVICE AND POWER SUPPLY METHOD THEREOF

(71) Applicants: Chien-Hung Wu, Taipei (TW); Nung-Te Huang, Taipei (TW); Yu-Cheng Shen, Taipei (TW); Hung-Wei Lin, Taipei (TW); Hsiao-Wen Chen, Taipei (TW)

(72) Inventors: Chien-Hung Wu, Taipei (TW); Nung-Te Huang, Taipei (TW); Yu-Cheng Shen, Taipei (TW); Hung-Wei Lin, Taipei (TW); Hsiao-Wen Chen, Taipei (TW)

(73) Assignee: ASUSTeK COMPUTER INC., Taipei (TW)

(*) Notice: Subject to any disclaimer, the term of this patent is extended or adjusted under 35 U.S.C. 154(b) by 287 days.

(21) Appl. No.: 13/706,364

(22) Filed: Dec. 6, 2012

(65) Prior Publication Data
US 2013/0293018 A1    Nov. 7, 2013

(30) Foreign Application Priority Data
May 7, 2012   (TW) .............................. 101116216 A

(51) Int. Cl.
| H02J 9/00 | (2006.01) |
| H02J 7/02 | (2006.01) |
| G06F 1/26 | (2006.01) |
| H02J 9/06 | (2006.01) |
| G06F 1/28 | (2006.01) |
| G06F 1/30 | (2006.01) |
| G06F 1/32 | (2006.01) |

(52) U.S. Cl.
CPC ................ *H02J 9/005* (2013.01); *G06F 1/263* (2013.01); *G06F 1/28* (2013.01); *G06F 1/305* (2013.01); *G06F 1/3206* (2013.01); *H02J 7/022* (2013.01); *H02J 9/06* (2013.01); *Y10T 307/625* (2015.04)

(58) Field of Classification Search
CPC ............. H02J 9/062; H02J 9/061; H02J 9/06; H02J 7/34; G06F 1/30
USPC .......................................................... 307/66
See application file for complete search history.

(56) References Cited

U.S. PATENT DOCUMENTS

| 5,428,267 | A | * | 6/1995 | Peil ................................ 315/224 |
| 5,828,207 | A | * | 10/1998 | Saadeh .......................... 323/281 |
| 7,131,011 | B2 | | 10/2006 | Westerinen et al. |
| 7,228,444 | B2 | | 6/2007 | Westerinen et al. |
| 7,550,873 | B2 | | 6/2009 | Jiang et al. |
| 7,688,026 | B2 | * | 3/2010 | An ................................ 320/111 |
| 8,259,119 | B1 | * | 9/2012 | Diard ............................ 345/502 |
| 8,482,552 | B2 | * | 7/2013 | Schrom et al. ................ 345/211 |
| 2003/0128562 | A1 | * | 7/2003 | Chang et al. .................... 363/89 |
| 2004/0032754 | A1 | * | 2/2004 | Yang .......................... 363/56.09 |
| 2004/0088589 | A1 | | 5/2004 | Westerinen et al. |
| 2004/0125626 | A1 | | 7/2004 | Kanouda et al. |

(Continued)

FOREIGN PATENT DOCUMENTS

| CN | 201298200 | 8/2009 |
| CN | 101567569 | 10/2009 |

(Continued)

*Primary Examiner* — Thienvu Tran
*Assistant Examiner* — Brian K Baxter
(74) *Attorney, Agent, or Firm* — Jianq Chyun IP Office

(57) ABSTRACT

A power supply system of an electronic device and a power supply method thereof are provided. Directly detecting the power voltage, when a power anomaly of the power voltage is detected, the electronic device may enter the energy-saving mode immediately for reducing power consumption, and a required DC voltage may be provided directly from the battery.

9 Claims, 3 Drawing Sheets

(56) References Cited

U.S. PATENT DOCUMENTS

| | | | |
|---|---|---|---|
| 2005/0206242 A1* | 9/2005 | Kanouda et al. | 307/66 |
| 2006/0123258 A1 | 6/2006 | Westerinen et al. | |
| 2007/0019442 A1* | 1/2007 | Li et al. | 363/15 |
| 2008/0252144 A1* | 10/2008 | Wang et al. | 307/66 |
| 2009/0044026 A1 | 2/2009 | Li et al. | |
| 2009/0129128 A1* | 5/2009 | Hirahara | 363/49 |
| 2009/0267418 A1* | 10/2009 | Lin et al. | 307/66 |
| 2010/0061121 A1* | 3/2010 | Udagawa | 363/16 |
| 2011/0012554 A1* | 1/2011 | Lin et al. | 320/107 |
| 2011/0157939 A1* | 6/2011 | Wang et al. | 363/125 |
| 2011/0286250 A1* | 11/2011 | Wang et al. | 363/125 |
| 2012/0001608 A1* | 1/2012 | Sato et al. | 323/282 |

FOREIGN PATENT DOCUMENTS

| | | |
|---|---|---|
| CN | 101728847 | 6/2010 |
| CN | 102103403 | 6/2011 |
| TW | 200419334 | 10/2004 |
| TW | 200826412 | 6/2008 |
| TW | I307009 | 3/2009 |

* cited by examiner

POWER SUPPLY SYSTEM OF ELECTRONIC DEVICE AND POWER SUPPLY METHOD THEREOF

CROSS-REFERENCE TO RELATED APPLICATION

This application claims the priority benefit of Taiwan application serial no. 101116216, filed on May 7, 2012. The entirety of the above-mentioned patent application is hereby incorporated by reference herein and made a part of this specification.

BACKGROUND OF THE INVENTION

1. Field of the Invention

The disclosure relates to a power supply system of an electronic device and a power supply method thereof and particularly relates to a power supply system of an electronic device and a power supply method thereof which may prevent the electronic device from crashing due to unstable voltage.

2. Description of Related Art

Power required for driving each element within a computer system is provided by a power supply, the power supply is capable of converting a power voltage (Alternating Current, AC) to a low DC (Direct Current) voltage for the computer system. The power supply may not operate normally when the power voltage is unstable or under blackout. As a result, the computer system may crash and losing critical data, which bringing losses and inconvenience to user.

Traditional approach for solving such problem is by connecting an UPS (Uninterruptable Power System) between an input end of the power supply and the power voltage. In the case where the power voltage is operating normally, the power voltage charges the battery within the UPS. In the case where the power voltage is not operating normally, a DC voltage is provided to the power supply by the battery of the UPS through a DC/AC converting circuit. The DC voltage allows the power supply to provide an operational voltage to the system end, so that user may have sufficient time to complete the tasks in progress.

Although the problem of dysfunctional power supply caused by power voltage being unstable or under blackout may be solved by the traditional approach, synchronization between the AC voltage and power voltage is a known issue to be considered when generating AC voltage by the UPS.

In the case where the AC voltage generated by the UPS is not synchronous with the power voltage, when the power provided by power voltage is converted to the power of the UPS, the system end may be provided with unstable voltage due to abrupt change of phase, thereby causing the system end to crash.

SUMMARY OF THE INVENTION

The disclosure provides a power supply system of an electronic device and a power supply method thereof, capable of providing a DC voltage to the electronic device when the power voltage is unstable or under blackout, which may prevent the electronic device from crashing due to unstable voltage. As a result, user may complete the tasks in progress and prevent critical data from losing.

The disclosure provides a power supply system of an electronic device, including a voltage detecting unit, an AC/DC converting unit, a control unit and a battery. Wherein, the voltage detecting unit detects a power voltage directly for generating a detecting signal. The AC/DC converting unit converts the power voltage to a DC voltage, and provides the DC voltage to the electronic device. The control unit is coupled to the voltage detecting unit, when a power anomaly of the power voltage is detected by the voltage detecting unit, the control unit controls the electronic device to enter an energy-saving mode according to the detecting signal. The battery is coupled to the AC/DC converting unit and provides a DC voltage that the electronic device needs in the energy-saving mode.

The disclosure provides a power supply method of an electronic device which includes the following steps. Converting a power voltage to a DC voltage, and providing the DC voltage to the electronic device. Detecting the power voltage directly to determine if a power anomaly occurs. Controlling the electronic device to enter an energy-saving mode when the power anomaly is detected. Providing a battery to provide a DC voltage that the electronic device needs in the energy-saving mode.

Based on the above, by directly detecting power status of the power voltage, the electronic device may enter the energy-saving mode for reducing power consumption and the DC voltage may be provided directly from the battery if a power anomaly of the power voltage is detected. Accordingly, the electronic device being crashed due to abrupt change of voltage phase may also be avoided. As a result, user may complete the tasks in progress and prevent critical data from losing.

Several embodiments accompanied with figures are described in detail below.

DESCRIPTION OF THE EMBODIMENTS

Figure 1:
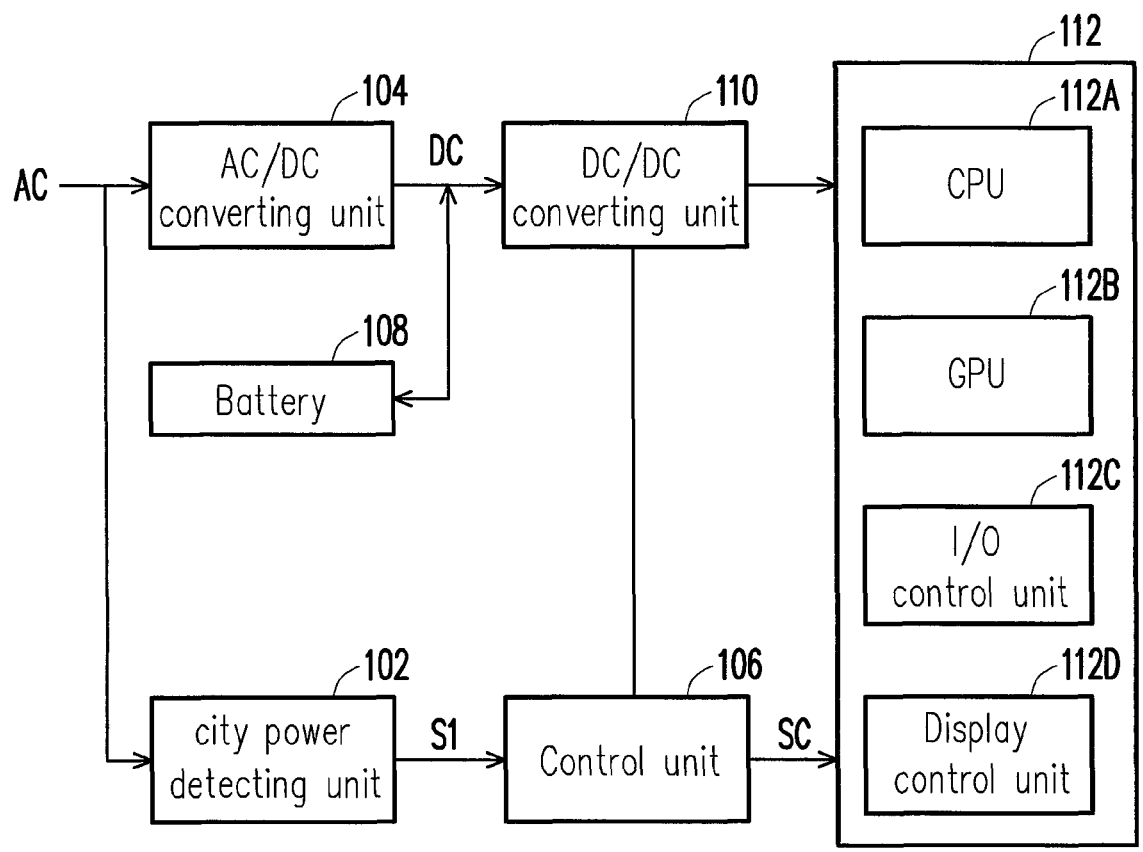
FIG. 1 is a schematic diagram illustrating a power supply system of an electronic device according to an embodiment of the disclosure.

FIG. 1 is a schematic diagram illustrating a power supply system of an electronic device according to an embodiment of the disclosure. Referring to FIG. 1, a power supply system of an electronic device 112 includes a voltage detecting unit 102, an AC/DC converting unit 104, a control unit 106, a battery 108 and a DC/DC converting unit 110. Wherein, the electronic device 112, for example, may be an all-in-one computer, a desktop computer or other electronic devices, and the battery 108, for example, may be a lead-acid battery, a fuel battery, a nickel hydride battery or a lithium ion battery. The control unit 106 is coupled to the voltage detecting unit 102, the DC/DC converting unit 110 and the electronic device 112, the DC/DC converting unit 110 is coupled to the AC/DC converting unit 104, the battery 108 and the electronic device 112. In addition, the battery 108 is coupled to the AC/DC converting unit 104.

The voltage detecting unit 102 is used to directly detect a power voltage AC for generating a detecting signal S1. The AC/DC converting unit 104 converts the power voltage AC to a DC voltage DC, and provides the DC voltage DC to the electronic device 112. The control unit 106 determines whether the power voltage AC includes a power anomaly according to the detecting signal S1. If the power anomaly is not detected, the control unit 106 controls the DC/DC converting unit 110 to convert the DC voltage DC outputted from the AC/DC converting unit 104 to a DC voltage for driving the electronic device 112. For example, in the present embodiment, the electronic device 112 includes a CPU 112A, a GPU 112B, an I/O control unit 112C and a display control unit 112D. The DC/DC converting unit 110 is controlled by the control unit 106 to convert the DC voltage DC outputted from AC/DC converting unit 104 to required DC voltages for driving the CPU 112A, the GPU 112B, the I/O control unit 112C and the display control unit 112D. Meanwhile, the battery 108 is also charged by the DC voltage DC outputted from the AC/DC converting unit 104.

On the contrary, if the control unit 106 determines that the power voltage AC includes a power anomaly, the control unit 106 controls the electronic device 112 to enter an energy-saving mode.

Figure 2:
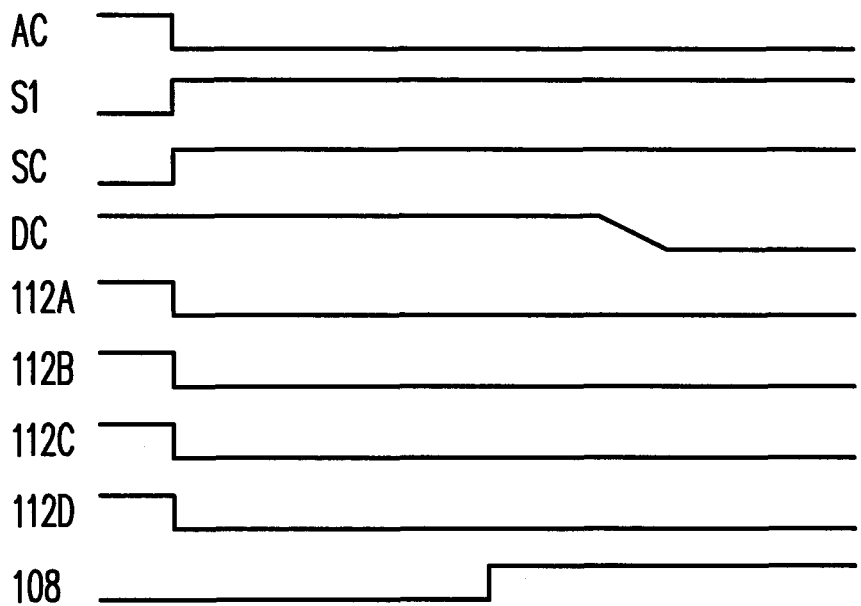
FIG. 2 is a diagram illustrating the waveform of a portion of the signals and elements illustrated in FIG. 1.

For example, FIG. 2 is a diagram illustrating the waveform of a portion of the signals and elements illustrated in FIG. 1. Referring to FIG. 2, a power anomaly is detected by the voltage detecting unit 102 when the power voltage AC is suspended (converted from high level state to low level state), and a detecting signal S1 is converted from low level state to high level state as to inform the control unit 106 that the power anomaly has been detected. The control units 106 converts a controlling signal SC to high level state according to the detecting signal S1, so that the following operations may be performed before converting the DC voltage DC to low level state: lowering frequency of the CPU 112A, switching the GPU 112B to an IGPU mode, controlling the I/O control unit 112C to turn off the peripheral devices and controlling the display control unit 112D to turn off the display power (as shown in FIG. 2, the waveforms which respectively representing the CPU 112A, the GPU 112B, the I/O control unit 112C and the display control unit 112D have been converted from high level state to low level state). That is, the electronic device 112 is controlled to enter the energy-saving mode.

It should be noted that, when a power anomaly of the power voltage AC is detected (such as under blackout), since the AC/DC converting unit 104 includes a capacitor element, the DC voltage DC will not convert to low level state immediately. Instead, the DC voltage DC is converted to low level state only after the capacitor has been discharged for a certain length of time (as shown in FIG. 2). The operations for entering the electronic device 112 to the energy-saving mode are completed before the DC voltage DC is converted to low level state.

After the electronic device 112 entered to the energy-saving mode, the control unit 106 may control the DC/DC converting unit 110 to convert the DC voltage provided by the battery 108 to a DC voltage Suitable for driving the electronic device 112 (as shown in FIG. 2, the waveform representing the battery 108 has been converted from low level state to high level state, namely, the battery 108 is now the supplying source of the DC voltage). It should be noted that, since the electronic device 112 has entered the energy-saving mode, the electronic device 112 includes much less power consumption comparing to the normal mode. Therefore, the DC voltage provided by the battery 108 may also be smaller. In other words, a sufficient voltage may be provided to the electronic device 112 to save critical data and enter a sleep mode without having a large size of the battery 108, which helps in reducing the overall size of the product.

Moreover, since the status of the power voltage AC is directly detected in the present embodiment, when a power anomaly of the power voltage AC is detected, the electronic device 112 may enter the energy-saving mode immediately.

In this case, the DC voltage provided by the voltage 108 is sufficient for the electronic device 112 in the energy-saving mode. Since the DC voltage is provided directly from the battery 108 without AC/DC converting, the known problem of the electronic device 112 being crashed due to abrupt change of voltage phase may be avoided. As a result, user may complete the tasks in progress and prevent critical data from losing.

Figure 3:
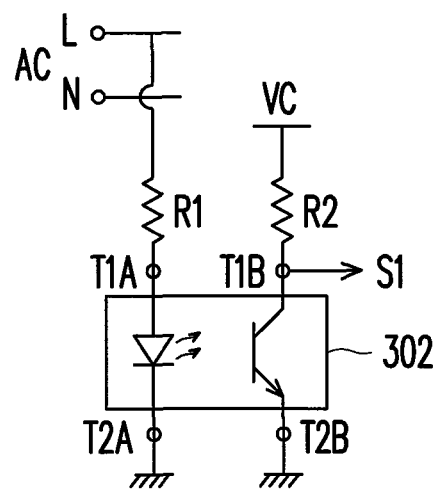
FIG. 3 is a circuit diagram illustrating a voltage detecting unit according to an embodiment of the present disclosure.

More specifically, FIG. 3 illustrates the operations of the voltage detecting unit 102. FIG. 3 is a circuit diagram illustrating a voltage detecting unit 102 according to an embodiment of the disclosure.

Referring to FIG. 3, the voltage detecting unit 102 includes a resistor R1, a resistor R2 and an optical coupler 302. Wherein, the resistor R1 includes a first end and a second end, the first end of the resistor R1 is coupled to an input end L among two input ends L and N of the power voltage AC, the second end is coupled to a first end T1A of an input side of the optical coupler 302, and a second end T2A of the input side of the optical coupler 302 is coupled to a ground.

In addition, the resistor R2 also includes a first end and a second end, the first end of the resistor R2 is coupled to an operational voltage VC, the second end of the resistor R2 is coupled to a first end T1B of an output side of the optical coupler 302, and a second end T2B of the output side of the optical coupler 302 is coupled to the ground. Wherein, the detecting signal S1 is outputted from the second end T2B of the output side of the optical coupler 302.

A light-emitting diode of the optical coupler 302 is conducted to emit light when the power voltage AC is provided normally, and a transistor of the optical coupler 302 is also conducted thereby. As a result, a voltage of the second end T2B of the output side of the optical coupler 302 is lowered, namely, the detecting signal S1 is at low level state (as shown in FIG. 2).

When the power voltage AC is not provided normally (such as under blackout), the light-emitting diode of the optical coupler 302 is turned off, and the transistor of the optical coupler 302 is also turned off. Therefore, the voltage of the second end T2B of the output side of the optical coupler 302 is increased by the operational voltage VC, namely, the detecting signal S1 is at high level state (as shown in FIG. 2). Wherein, the operational voltage VC, for example, may be provided by the battery 108.

Figure 4:
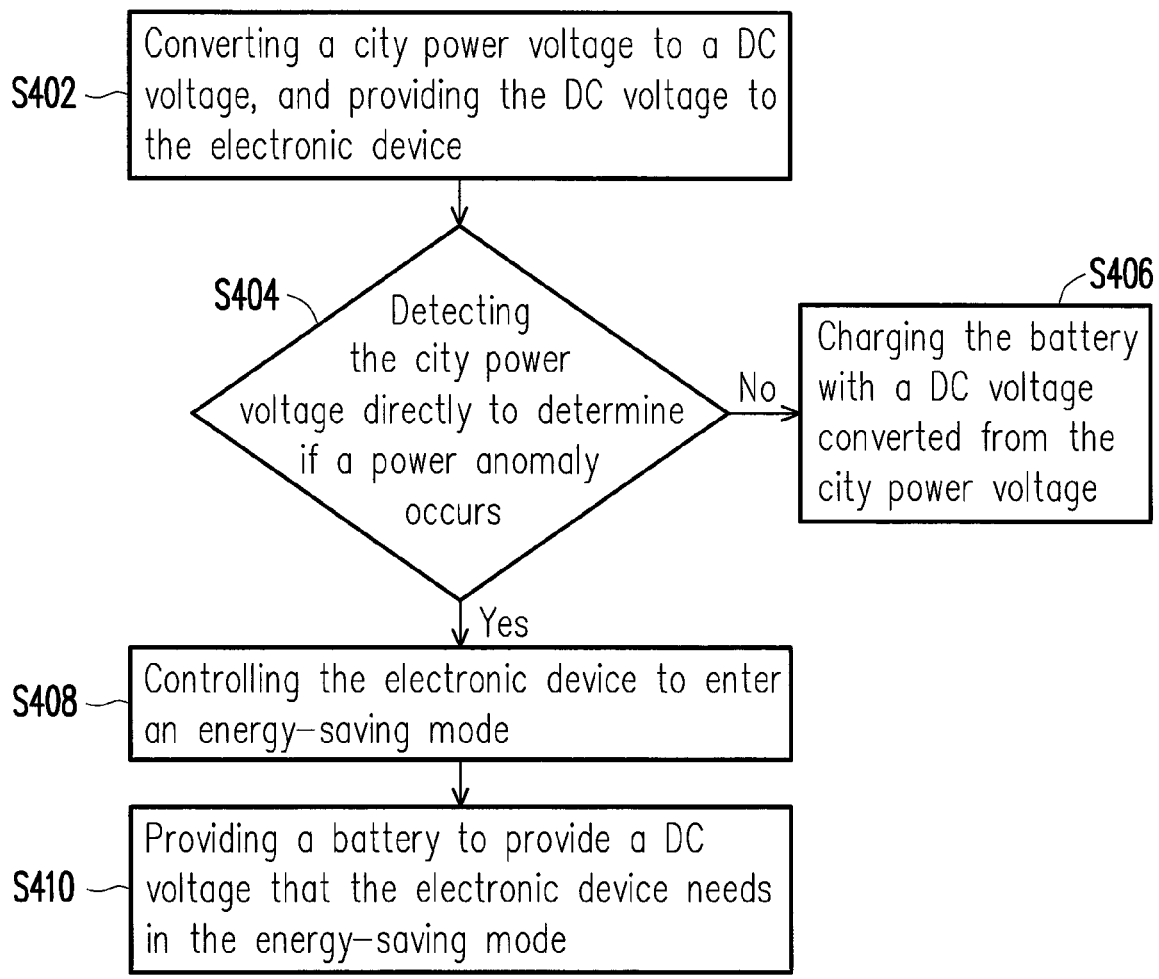
FIG. 4 is a flow diagram illustrating a power supply method of an electronic device according to an embodiment of the disclosure.

FIG. 4 is a flow diagram illustrating a power supply method of an electronic device according to an embodiment of the disclosure. Referring to FIG. 3, the power supply method of the electronic device may include the following steps. First, converting a power voltage to a DC voltage, and providing the DC voltage to the electronic device (Step S402). Next, detecting the power voltage directly to determine if a power anomaly occurs (Step S404). Charging the battery with a DC voltage converted from the power voltage if the power anomaly is not detected (Step S406).

On the contrary, controlling the electronic device to enter an energy-saving mode when the power anomaly is detected (Step S408). Wherein, the method for entering the electronic device to the energy-saving mode, for example, may be lowering frequency of a CPU, switching a GPU to an IGPU mode, turning off peripheral devices and turning off a display power. Lastly, after the electronic device entered the energy-saving mode, providing a battery to provide a DC voltage that the electronic device needs in the energy-saving mode (Step S410).

Based on the above, by directly detecting power status of the power voltage, the electronic device may enter the energy-saving mode for reducing power consumption and the DC voltage may be provided directly from the battery if a power anomaly of the power voltage is detected. Accordingly, the electronic device being crashed due to abrupt change of voltage phase may also be avoided. As a result, user may complete the tasks in progress and prevent critical data from losing.

Since the electronic device has entered the energy-saving mode, the electronic device includes much less power consumption comparing to the normal mode. Therefore, the DC voltage provided by the battery may also be smaller. That is, a sufficient voltage may be provided for the electronic device to save the critical data and enter a sleep mode without having a large size of the battery. As a result, the size of the electronic product may be effectively reduced.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed is:

1. A power supply system of an electronic device, comprising:
    a voltage detecting unit, configured to detect a power voltage for generating a detecting signal;
    an AC/DC converting unit, configured to convert the power voltage to a DC voltage, and the DC voltage is provided to the electronic device;
    a control unit, coupled to the voltage detecting unit, when a power anomaly of the power voltage is detected by the voltage detecting unit, the electronic device is controlled by the control unit to enter an energy-saving mode according to the detecting signal; and
    a battery, coupled to the AC/DC converting unit and the electronic device, a DC voltage that the electronic device needs is provided in the the energy-saving mode;
    wherein the voltage detecting unit comprises:
        a first resistor, having a first end and a second end, wherein the first end is coupled to an input end of a power voltage; and
        an optical coupler, having an input side and an output side, wherein the input side has a first end and a second end, the first end of the input side is coupled to the second end of the first resistor, and the second end of the input side is coupled to a ground.

2. The power supply system of the electronic device according to claim 1, wherein the battery is charged by the AC/DC converting unit when the electronic device is in a normal mode.

3. The power supply system of the electronic device according to claim 1, wherein the electronic device comprising a CPU, a GPU, an I/O control unit and a display control unit, and the power supply system further comprising:
    a DC/DC converting unit, coupled to the control unit, the CPU, the GPU, the I/O control unit, the display control unit, the AC/DC converting unit and the battery, the DC/DC converting unit is controlled by the control unit to convert the DC voltage to voltages required for driving the CPU, the GPU, the I/O control unit and the display control unit.

4. The power supply system of the electronic device according to claim 3, wherein the electronic device is entered the energy-saving mode according to the detecting signal through the control unit by lowering frequency of the CPU, switching the GPU to an IGPU mode, controlling the I/O control unit to turn off peripheral devices and controlling the display control unit to turn off a display power.

5. The power supply system of the electronic device according to claim 1, wherein the voltage detecting unit further comprising:
    a second resistor, having a first end and a second end, wherein the first end is coupled to an operational voltage;
    wherein the output side of the optical coupler has a first end and a second end, the first end of the output side is coupled to the second end of the second resistor and the control unit, and the second end of the output side is coupled to the ground.

6. The power supply system of the electronic device according to claim 1, wherein the battery is a lead-acid battery, a fuel battery, a nickel hydride battery or a lithium ion battery.

7. A power supply method of an electronic device, comprising:
    converting a power voltage to a DC voltage, and providing the DC voltage to the electronic device;
    detecting the power voltage to determine if a power anomaly occurs;
    controlling the electronic device to enter an energy-saving mode when the power anomaly of the power voltage is detected; and
    providing a battery to provide a DC voltage that the electronic device needs in the energy-saving mode;
    wherein the power supply system of the electronic device further comprising a CPU, a GPU, an I/O control unit and a display control unit, and the method for entering the electronic device to the energy-saving mode comprising:
    lowering frequency of the CPU, switching the GPU to an IGPU mode, controlling the I/O control unit to turn off peripheral devices and turning off a display power.

8. The power supply method of the electronic device according to claim 7, wherein when the power anomaly is not detected, charging the battery with the DC voltage converted from the power voltage.

9. The power supply method of the electronic device according to claim 7, wherein the battery is a lead-acid battery, a fuel battery, a nickel hydride battery or a lithium ion battery.

* * * * *